United States Patent Office 3,455,876
Patented July 15, 1969

3,455,876
POLY-α-OLEFIN COMPOSITION STABILIZED
WITH β,β'-THIO-DIBUTYRATES
Jun Kusama, 2536 Kamimeguro 5 Meguroku, Tokyo-to,
Japan, and Teruhisa Fujiwara and Yuzo Chihara, both
of 21 Otsutomocho Kanagawa-ku, Yokohama-shi,
Japan
No Drawing. Filed May 2, 1966, Ser. No. 546,584
Claims priority, application Japan, May 8, 1965,
40/26,841
Int. Cl. C08f 45/58, 29/02
U.S. Cl. 260—45.85                    6 Claims

ABSTRACT OF THE DISCLOSURE

A poly-α-olefin composition containing as a stabilizer .001 to 3% by weight based upon the polyolefin of a dialkyl-β,β'-thio-dibutyrate wherein the alkyl groups contain from 10 to 30 carbon atoms.

---

This invention relates to a poly-α-olefin composition which is resistant to degradation due to light, heat and oxygen.

More particularly, it relates to a poly-α-olefin composition which is resistant to degradation due to light, heat and oxygen and which does not cause sweating-out (exudation) of a stabilizer constituent on the surface of shaped articles made thereof by incorporating therein a di-higher alkyl-β,β'-thio-dibutyrate as an essential stabilizer ingredient.

Polyolefins such as polypropylene, polyethylene, copolymer of ethylene and propylene or the like cannot withstand the ordinary hot processing operation without sustaining serious impairments of their physical properties when they are to be made into mold articles, fibers, films or the like. Even after fabrication, articles manufactured from poly-α-olefins are subject to changes in their physical appearance and properties, due to their exposure to sunlight, heat, oxygen and the like. This change or degardation in the properties of the polyolefin material has, in the past, impaired its use as a basic manufacturing material. In order to improve the properties of poly-α-olefins it has been a common practice to add various light stabilizers and antioxidants to the poly-α-olefin compositions. For example, additives such as dialkyl-β,β'-thio-dipropionate including the dilauryl and distearyl derivatives in combination with various phenolic derivatives such as 4,4'-butylene-bis(6-t-butyl-m-cresol) and 2,6-di-t-butyl-p-cresol have been used as stabilizers for poly-α-olefins. In addition to the foregoing, many other compounds and combinations of compounds have been added to poly-α-olefins to stabilize them and increase their resistance to ultra-violet light degradation. A constant drawback to the use of the various prior art stabilizers has been the problem of the sweating out of the stabilizers on the surfaces of the shaped articles, and the concurrent loss of their stabilizing properties. It is therefore apparent that the invention of a stabilizer that will not exude from the poly-α-olefin in which it is incorporated would represent a significant advance in the art.

An object of this invention is to provide a poly-α-olefin composition resistant to deterioration due to light, heat and oxygen and a method for producing the same by incorporating therein a novel and inexpensive stabilizer alone or together with another stabilizer which stabilizer will not sweat out of the shaped poly-α-olefin. It has now been found such an object can be attained by the present invention.

According to present invention, poly-α-olefin copolymers can be stabilized much more effectively than with any other prior art stabilizers, by incorporating therein a novel compound, a di-higher alkyl-β,β'-thio-dibutyrate. The di-higher alkyl-β,β'-thio-dibutyrate may be used alone to stabilize poly-α-olefins or may be used in combination with other heretofore recognized stabilizers.

These di-higher alkyl-β,β'-thio-dibutyrates have a general formula:

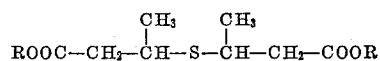

wherein R is an alkyl group having from 10 to 30 carbon atoms, preferably from 12 to 20 carbon atoms. When the number of carbon atoms in the alkyl group, R, is less than 10 the esters are undesirably volatile, have an unpleasant odor during heat processing, and tend to exude on the surface of the fabricated articles. As the number of the esters exude on the surfaces of the polyolefin articles. As the carbon atoms increase to more than 30, the esters become unsuitable, because of the difficulty of their manufacture. When the number of carbon atoms constituting R is less than 10 the ester is a liquid at room temperature while when R is more than 14 the esters are solids. For example, diisodecyl-β,β'-thio-dibutyrate is liquid at room temperature and the melting points of dilauryl-, dicetyl-, and distearyl-β,β'-thio-dibutyrate are 26–28° C., 39–41° C., and 54–56° C., respectively.

Representative examples of the di-higher alkyl-thio-dibutyrates of the invention include; di-normal- and di-iso-alkyl esters of β,β'-thio-dibutyric acid, such as didecyl, diisodecyl, dilauryl, diisolauryl, dimyristyl, diisopentadecyl, di-2,2'-dimethyl dodecyl), dicetyl, distearyl, dieicosyl, dihexacosyl esters. Suitable esters are selected from among them according to the kinds of poly-α-olefins, conditions of treatments, conditions of their uses or the like.

Di-higher alkyl-β,β'-thio-dipropionates which are conventionally used, require a relatively expensive acrylic acid as a starting material, the total yield is low in their manufacture, and the stabilizing effect is insufficient, whereas di-higher alkyl-β,β'-thio-dibutyrates of the invention require an inexpensive crotonic acid as a starting material, the total yield is high in their manufacture and the stabilizing effect is far superior to those of the thiodipropionate esters.

The additional methyl groups in the chemical structure of the thio dibutyrates of this invention are probably somewhat responsible for the superior stabilizing effects of these compounds over the conventional thio dipropionates.

Di-higher alkyl-β,β'-thio-dubutyrates can be produced by various methods which can be summarized as follows: These esters can be produced (1) by esterifying β,β'-thio-dibutyric acid with a saturated aliphatic alcohol containing 10–30 carbon atoms, or (2) by making di-lower alkyl-β,β'-thio-dibutyrate carrying out an ester-exchange reaction with a saturated aliphatic alcohol, or (3) by reacting crotonic acid or lower alkyl crotonate with a saturated aliphatic alcohol and then reacting the resultant higher alkyl crotonate with H₂S in the presence of a catalyst.

As between the above processes, the reaction of higher alkyl crotonates with H₂S in the presence of a catalytic amount of alkali metal alcoholate is preferable because of its superior production yield.

The di-higher alkyl-β,β'-thio-dibutyrates of the present invention are incorporated in poly-α-olefin copolymers, alone or together with an effective phenolic stabilizer, in an amount of 0.001%–3% by weight based upon the polymers. Examples of the effective phenols include:

2.6-di-t-butyl-p-cresol, 2.4-dimethyl-6-t-butylphenol, 2.4-dipropyl-5-methylphenol, 3-methyl-4-isopropylphenol, 2.6-di-t-butyl-2-methoxy-p-cresol, 2.2'-methylene-bis[4-methyl-6-t-butylphenol], 2.2'-methylene-bis[4-ethyl-6-t-butylphenol], 4.4'-methylene-bis[6-t-butyl-o-cresol], 4.4'-methylene-bis[2.6-di-t-butylphenol], 2.6-bis[2'-hydroxy-3'-t-butyl-5'-methyl-benzyl]-4-methyl phenol or the like. Besides the above-mentioned phenols, auxiliary agents such as calcium stearate, aluminum stearate or the like, and further, if necessary, additives such as U.V. inhibitor, corrosion inhibitor, antistatic agent, plasticizer, slipping agent, filler or the like can be incorporated therein.

The stabilizer can be incorporated in the polyolefin by dissolving the stabilizer in a suitable solvent such as benzene and mixing the resultant solution with the polyolefin followed by the evaporation of the solvent, or by merely mixing the stabilizer alone with a polyolefin with stirring, or by adding the stabilizer to the polyolefin at the end of polymerization stage.

As poly-$\alpha$-olefins which can be stabilized by the present stabilizer, polypropylene, polyethylene, and ethylene-propylene copolymer are preferable and polypropylene are particularly preferred. However, poly-$\alpha$-olefins such as poly-3-methyl-butene-1, poly-4-methyl-pentene-1, poly-pentene-1, poly-3.3-dimethyl-butene-1, poly-octene-1, poly-decene-1 or the like, or $\alpha$-olefin copolymer (containing graft, block copolymer), also can be used.

As above-mentioned, the di-higher alkyl-$\beta,\beta'$-thio-dibutyrates of the invention are far superior in their stabilizing effect than the other polyolefin stabilizers which are generally used, such as diesters of $\beta,\beta'$-thio-dipropionic acid. Comparative tests in which dilauryl-$\beta,\beta'$-thio-dipropionate and dicetyl-$\beta,\beta'$-thio-dibutyrate, alone or combined with 2.6-di-t-butyl-p-cresol have been incorporated in a crystalline polypropylene are as follows:

which is frequently encountered with the use of conventional stabilizers. For example, when stearyl ester of $\beta,\beta'$-thio-dipropionic acid is used as a stabilizer for polypropylene film, the stabilizer is exuded on the surface of film. This is a fatal drawback in the use of plastic films for food packaging. By the use of a higher alkyl ester of $\beta,\beta'$-thio-dibutyric acid, the above-mentioned drawback of exudation can be completely overcome.

The following examples are given in order to illustrate the present invention but it is to be understood that they are not intended as limitations thereof.

EXAMPLE 1

To 100 parts of crystalline polypropylene (intrinsic viscosity/$\eta$/=1.9), were added the following stabilizers dissolved in benzene. The mixtures were kneaded to the paste form and dried and further dried in vacuo at room temperature. Then they are pressed at 200° C. for five minutes, and further pressed at a pressure of 200 kg./cm.$^2$ for five minutes to give sheets having thickness of 1 mm.

Test items (1) Thermal resistance (oven life).—Samples were put on an aluminum dish placed in an oven through which air heated at 154° C. is recycled. The times elapsed until cracks were formed on the surface were measured.

(2) Weather resistance.—A weatherometer (B.P.T. 75° C., carbon arc) was used. The times elapsed until samples were broken by 90° bendings were measured.

(3) Coloring.—The effects on the coloring of the sheets were observed over a 96-hour thermal resistance test period and a 200 hour weather resistance test period. Experimental results were as follow:

TABLE 1

| Experiment No. | Blending recipe (part per 160 parts of polypropylene) | Thermal resistance period (hr.) | Weather resistance period (hr.) | Coloring states in the said 96 and 200 hours |
|---|---|---|---|---|
| 1 | DLTDP, 0.5 | 290–305 | 360–370 | |
| 2 | DSTDP, 0.5 | 150–160 | 275–290 | |
| 3 | DMTDB, 0.5 | 405–410 | 760–770 | |
| 4 | DCTDB, 0.5 | 375–385 | 840–850 | |
| 5 | DSTDB, 0.5 | 385–390 | 685–690 | No change. |
| 6 | DLTDP, 0.25 plus (BHT, 0.1; Q-158, 0.2; CaSt, 0.15) | 550–560 | 340–350 | |
| 7 | DSTP, 0.25 plus (BHT, 0.1; Q-158, 0.2; CaSt, 0.15) | 630–650 | 360–370 | |
| 8 | DMTDB, 0.25 plus (BHT, 0.1; Q-158, 0.2; CaSt, 0.15) | 1,020–1,030 | 515–530 | |
| 9 | DCTB, 0.25 plus (BHT, 0.1; Q-158, 0.2; CaSt, 0.15) | 965–970 | 640–650 | |
| 10 | DSTB, 0.25 plus (BHT, 0.1; Q-158, 0.2; CaSt, 0.15) | 1,010–1,020 | 525–530 | |

NOTE:
DLTDB—Dilauryl-$\beta,\beta'$-thio-dipropionate.
DSTDP—Distearyl-$\beta,\beta'$-thio-dipropionate.
DMTDB—Dimyristyl-$\beta,\beta'$-thio-dibutyrate (the invention ester).
DCTDB—Dicetyl-$\beta,\beta'$-thiodibutyrate (the invention ester).
DSTDB—Distearyl-$\beta,\beta'$-thio-dibutyrate (the invention ester).
BHT—2.6-di-t-butyl-p-cresol.
Q-158—A phenolic compound containing zinc and phosphor.
CaSt—Calcium stearate.

EXAMPLE 2

To 100 parts of ethylene-propylene copolymer containing 5% of ethylene and 95% of propylene were added

TABLE A

| Experiment No. | Dilauryl-$\beta,\beta'$-thio-dipropionate, percent | Dicetyl-$\beta,\beta'$-thio-dibutyrate (this invention) percent | 2.6-di-t-butyl-p-cresol, percent | Heat degradation period, hour | Light degradation period, hour |
|---|---|---|---|---|---|
| 1 | 0 | 0 | 0.1 | 6 | 100 |
| 2 | 0.5 | 0 | 0 | 2 | 80 |
| 3 | 0 | 0.5 | 0 | 8 | 280 |
| 4 | 0.5 | 0 | 0.1 | 30 | 100 |
| 5 | 0 | 0.5 | 0.1 | 40 | 300 |

NOTE.—The heat degradation tests: Samples were placed in a test tube and heated at 54° C. Times elapsed until cracks are formed by 90° bendings were measured. The light degradation tests: Samples were irradiated by fadometer (carbon arc) and heated at 63±5° C. Times elapsed until cracks are formed by 90° bendings were measured.

The important advantage gained by the use of higher alkyl ester of $\beta,\beta'$-thio-dibutyric acid as a stabilizer of polyolefin is that the stabilizer will not elude, a problem the stabilizers shown in the following table. Test pieces were made from the resultant mixture by the same manner as in Example 1.

Experimental results

TABLE 2

| Experiment No. | Blending recipe (part) (ethylene-propylene copolymer 100 parts) | Thermal resistance period (hr.) | Weather resistance period (hr.) | Coloring state in the said 96 and 200 hours |
|---|---|---|---|---|
| 1 | DLTDP, 0.5 | 255–260 | 415–420 | |
| 2 | DLTDB, 0.5 | 355–360 | 580–590 | |
| 3 | DMTDB, 0.5 | 345–355 | 770–775 | |
| 4 | DCTDB, 0.5 | 335–350 | 820–830 | |
| 5 | DSTDB, 0.5 | 375–385 | 690–700 | No change. |
| 6 | DLTDP, 0.5 plus Ethyl A–702, 0.25 | 640–650 | 390–400 | |
| 7 | DLTDB, 0.5 plus Ethyl A–702, 0.25 | 960–980 | 630–640 | |
| 8 | DMTDB, 0.5 plus Ethyl A–702, 0.25 | 980–1,000 | 680–685 | |
| 9 | DCTDB, 0.5 plus Ethyl A–702, 0.25 | 960–980 | 660–670 | |
| 10 | DSTDB, 0.5 plus Ethyl A–702, 0.25 | 980–1,010 | 760–765 | |

NOTE.—Ethyl A–702—4,4′-methylene-bis-(2.6-di-t-butylphenol).

EXAMPLE 3

To 100 parts of crystalline polypropylene were added the following stabilizers, and test pieces were made and tested in the same manner as in Example 1.

Experimental results

TABLE 3

| Experiment No. | Blending recipe (part per 100 parts of polypropylene) | Thermal resistance period (hr.) | Weather resistance period (hr.) |
|---|---|---|---|
| 1 | DLTDP, 0.5 plus BHT, 0.25 | 450–460 | 210–220 |
| 2 | DLTDB, 0.5 plus Santowhite, 0.25 | 1,110–1,120 | 530–540 |
| 3 | DCTDB, 0.5 plus Santonox R, 0.25 | 1,140–1,155 | 550–565 |
| 4 | DCTDB, 0.5 plus Topanol CA, 0.25 | 1,120–1,130 | 365–375 |
| 5 | DCTDB, 0.5 plus Irganox 565, 0.25 | 740–745 | 320–330 |
| 6 | DCTDB, 0.5 plus Irganox 858, 0.25 | 1,020–1,030 | 320–330 |
| 7 | DSTDB, 0.5 plus Irganox 1076, 0.25 | 1,450–1,465 | 360–365 |
| 8 | DSTDB, 0.5 plus Irganox 1093, 0.25 | 900–910 | 400–410 |
| 9 | DSTDB, 0.5 plus Antioxidant 80, 0.25 | 600–610 | 350–360 |
| 10 | DSTDB, 0.5 plus Antigen W, 0.25 | 730–745 | 360–375 |
| 11 | DSTDB, 0.5 plus Nonflex, 0.25 | 720–730 | 350–360 |
| 12 | DSTDB, 0.5 plus Antioxidant 423, 0.25 | 990–1,000 | 350–360 |

NOTE:
Santowhite—4,4′-butylidene-bis(3-methyl-6-t-butylphenol).
Santonox R—4,4′-thio-bis(3-methyl-6-t-butylphenol).
Topanol CA—1,1,3-Tris(2-methyl-5-t-butyl-4-hydroxy-phenyl)butane.
Irganox 565—2,4-bis(n-octylthio)-6-(4-hydroxy-3,5-di-t-butyl-anilino)-1,3,5-triazine.
Irganox 858—n-octylthio-2,6-bis(4-hydroxy-3.5-di-t-butyl-anilino)-1,3,5-triazine.
Irganox 1076—4-hydroxy-3,5-t-butylphenyl-propionic acid-stearyl.
Irganox 1093—4-hydroxy-3,5-t-butylbenzyl-dialkylphosphite.
Anitoxidant 80—2,6-bis(2′-hydroxy-3-t-butyl-5′-methylbenzyl)-4-methylphenol.
Antigen W—4,4′-cyclohexyl-bisphenol.
Nonflex—Stylenized phenol.
Antioxidant 423—A phenolic compound.

EXAMPLE 4

To 100 parts of crystalline polyethylene were added the following stabilizers, and test pieces were made and tested.

Experimental results

TABLE 4

| Experiment No. | Blending recipe (part per 100 parts of polypropylene) | Thermal[1] resistance period (hr.) |
|---|---|---|
| 1 | DLTDP, 0.025 | 210–220 |
| 2 | DSTDP, 0.025 | 240–250 |
| 3 | DLTDB, 0.025 | 330–340 |
| 4 | DCTDB, 0.025 | 350–360 |
| 5 | DSTDB, 0.025 | 330–340 |
| 6 | DLTDP, 0.025 plus BHT 0.025 | 380–390 |
| 7 | DSTDP, 0.025 plus BHT 0.025 | 380–390 |
| 8 | DLTDB, 0.025 plus BHT 0.025 | 550–560 |
| 9 | DCTDB, 0.025 plus BHT 0.025 | 550–560 |
| 10 | DSTDB, 0.025 plus BHT 0.025 | 530–540 |

[1] Thermal resistance tests were carried out at 125° C.

What is claimed is:

1. A poly α-mono-olefin composition resistant to degradation due to light, heat and oxygen containing a non-exuding stabilizer comprised of a di-higher alkyl-$\beta,\beta'$-thio-dibutyrate of the general formula,

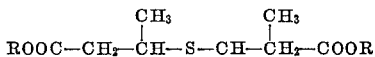

wherein R is an alkyl group containing 10 to 30 carbon atoms, in an amount of 0.001 to 3% by weight based upon said polyolefins.

2. A composition according to claim 1 wherein said stabilizer comprises dilauryl-$\beta,\beta'$-thio-dibutyrate.

3. A composition according to claim 1 wherein said stabilizer comprises dimyristyl-$\beta,\beta'$-thio-dibutyrate.

4. A composition according to claim 1 wherein said stabilizer comprises dicetyl-$\beta,\beta'$-thio-dibutyrate.

5. A composition according to claim 1 wherein said stabilizer comprises distearyl-$\beta,\beta'$-thio-dibutyrate.

6. A composition according to claim 1 in which said poly-α-mono-olefin is crystalline polypropylene.

References Cited

UNITED STATES PATENTS

| 3,196,185 | 7/1965 | Ranson | 260—619 |
| 3,255,136 | 6/1966 | Hecker et al. | 260—23 |
| 3,227,676 | 1/1966 | Mills et al. | 260—45.85 |

HOSEA E. TAYLOR, JR., Primary Examiner

U.S. Cl. X.R.

260—45.95, 23, 396